No. 759,791. PATENTED MAY 10, 1904.
E. C. WILLS.
METALLURGICAL FURNACE.
APPLICATION FILED JAN. 5, 1903.
NO MODEL. 2 SHEETS—SHEET 1.
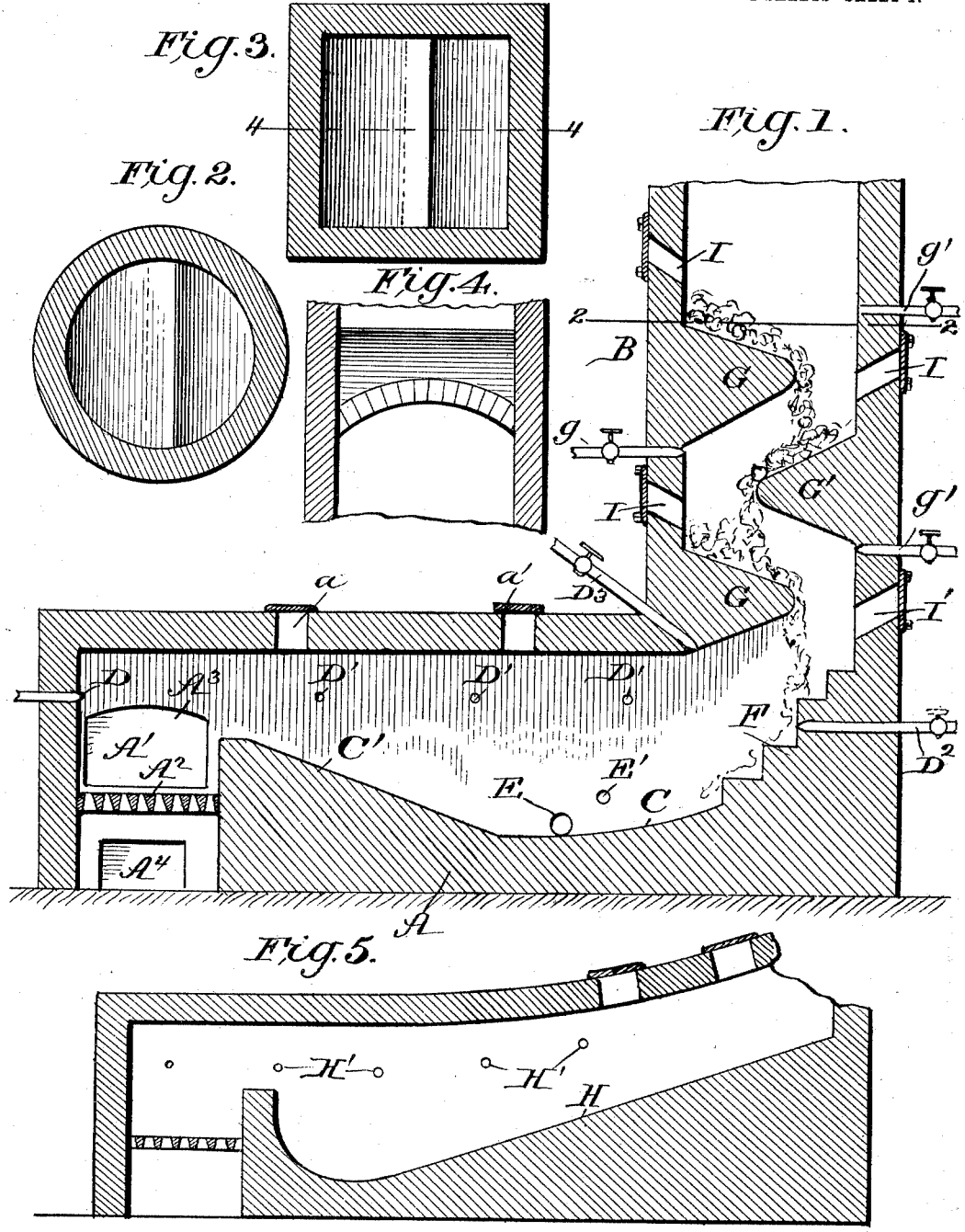
WITNESSES:
Jos. A. Ryan
Perry B. Turpin
INVENTOR
Edwin C. Wills.
BY Munn & Co.
ATTORNEYS.

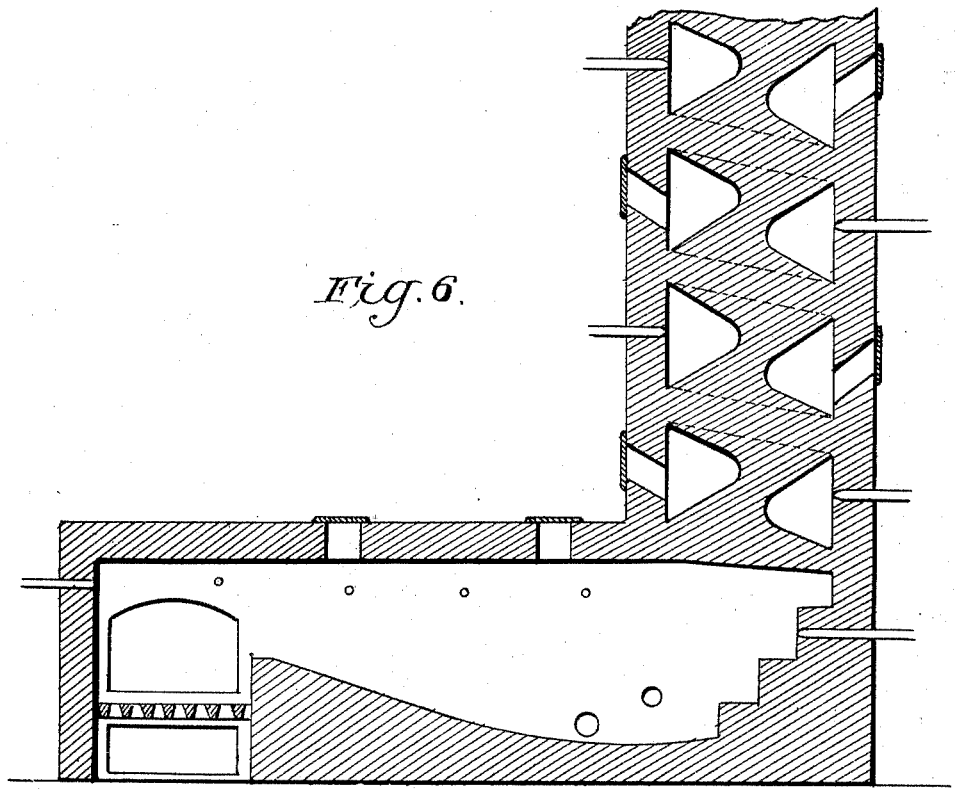

No. 759,791.                                                                                                   Patented May 10, 1904.

UNITED STATES PATENT OFFICE.

EDWIN COOPER WILLS, OF ALTOONA, PENNSYLVANIA.

METALLURGICAL FURNACE.

SPECIFICATION forming part of Letters Patent No. 759,791, dated May 10, 1904.

Application filed January 5, 1903. Serial No. 137,955. (No model.)

*To all whom it may concern:*

Be it known that I, EDWIN COOPER WILLS, a citizen of the United States, residing at Altoona, in the county of Blair and State of Pennsylvania, have made certain new and useful Improvements in Metallurgical Furnaces, of which the following is a specification.

My invention is an improvement in metallurgical furnaces, and particularly in that class of such furnaces designed for the reduction of ore and for the melting of pig-iron and other metals; and the invention consists in certain novel constructions and combinations of parts, as will be hereinafter described and claimed.

In the drawings, Figure 1 is a vertical section, partly broken away, of a furnace embodying my invention. Fig. 2 is a cross-section of the preheater on about line 2 2 of Fig. 1. Fig. 3 is a cross-sectional view showing a different cross-sectional shape of preheater. Fig. 4 is a detail section on about line 4 4 of Fig. 3. Fig. 5 shows a fixed inclined hearth-section, and Fig. 6 shows a spiral fixed inclined hearth-section.

By my invention I seek to provide hearth-like surfaces down which the ore and metal may feed by gravity, and subject the material so fed to the action of a flame from an oil-burner independently of or in conjunction with the heat from an ordinary furnace.

In Fig. 1 the furnace is formed with the main section A and the preheater B in the form of an upright uptake at one end of the main section A, a fire-box A' being provided at the opposite end of the main section A and adapted for the consumption of coal or similar fuel, and the hearth C being formed between the furnace A' and the preheater B, as shown. The furnace A' has grate-bars A², a charging-door A³, and an ash-door A⁴, and an oil-burner D discharges into the main section A above the fire-box A' and may be used independently of or in conjunction with a fire in the box A' in heating the furnace. Oil-burners D' open into the side of the main section A of the hearth, and charging-openings $a$ and $a'$ are formed in the top of the section A above the hearth. I also form an inclined surface C', arranged at its upper end below the charging-opening $a$ and inclining from the fire-box A' downwardly toward the metal-tap E and adapted for use in preheating ore and metal supplied through the opening $a$ in reducing ore and metal and also for use in feeding down to the body of the metal on the hearth C ferromanganese, ferrosilicon, or various similar metals or alloys which may be used in converting the metal on the hearth C into steel.

At the end of the hearth C opposite the inclined surface C' is formed a series of steps F, which receive the ore or metal discharged from the preheater B and direct the same to the hearth C. These steps partake of the general nature of an incline, as the material feeds by gravity down the same, being subjected to the action of the heat from the fire-box A' and burners D and D' and also to the action of the heat from the burners D² and D³. The burner D² opens through the wall on which the steps F are formed, while the burner D³ opens through the opposite wall, the ore being thoroughly heated upon the steps F.

A charging-opening I', suitably closed, is arranged above the steps F, and these steps receive the metal supplied to the opening I', as well as the metal discharged from the lowermost one G of the projections G', which are formed on one side of the preheater B and alternate with the projections G' on the opposite side or wall of the preheater, providing staggered projections, whose upper sides are inclined and which direct the ore from side to side in its passage down the preheater. Suitably-closed charging-openings I are arranged to discharge to the projections G and G', and burners $g$ and $g'$ open through the opposite sides of the preheater and discharge onto the mass of ore or metal on the staggered projections at the opposite side of the preheater, as will be understood from Fig. 1.

The metal may be discharged through the metal-tap E and the slag from the slag-tap E', and in operation the metal may be charged at the top of the preheater or fresh supplies of metal added at different points through the several charging openings or doors, as before described.

In Fig. 2 the preheater is shown circular in cross-section, while in Fig. 3 it is rectangular, and in the latter construction it may be desirable to support the baffle projections on arches extending from side to side of the preheater, as shown in Fig. 4.

In Fig. 5 the furnace is shown with a fixed inclined hearth H, and oil-burners H' discharge upon the ore supplied to the said hearth. In this construction, as in the other constructions before described, the ore or metal feeds by gravity downward and is subjected to the action of the flames from the oil-burners as it is converted in the manner desired.

In Fig. 6 I show the fixed inclined hearth-section inclosed in a spiral within the upright preheater charging-gates for the introduction of the ore or metal and burners arranged at intervals along the inclined hearth-section, as shown in the said figure.

Having thus described my invention, what I claim as new, and desire to secure by Letters Patent, is—

1. The improvement in metallurgical furnaces herein described comprising the body or main section having a hearth provided at one end with a fire-box and adjacent thereto with an inclined surface and at its opposite end with steps and with a preheater projecting above the steps and provided with the opposite inwardly-projecting staggered projections and having charging openings or doors arranged above the steps and the several inwardly-extending projections, an oil-burner discharging to the fire-box, oil-burners discharging into the body or main section, and oil-burners discharging to the steps and to the several inwardly-extending staggered projections of the preheater substantially as set forth.

2. The combination in a metallurgical furnace of the body or main section having at one end a series of steps, and a preheater above the same and provided with the opposite inwardly-extending staggered projections, the lower one of which discharges to the steps, and the oil-burners operating upon the material supplied to the said steps and staggered projections substantially as set forth.

3. The combination in a metallurgical furnace of the body or main section having a series of steps at one end and a preheater above the same and provided with opposite inwardly-extending staggered projections and having charging openings or doors above the said steps and projections, and the oil-burners discharging to the steps and to the several staggered projections whereby to operate upon the material supplied to such steps and projections substantially as set forth.

EDWIN COOPER WILLS.

Witnesses:
SOLON C. KEMON,
PERRY B. TURPIN.